United States Patent
Cucu et al.

(10) Patent No.: US 11,568,026 B1
(45) Date of Patent: Jan. 31, 2023

(54) UTILIZING ENCRYPTED DIGITAL COMMUNICATIONS TO DYNAMICALLY SECURE DIGITAL RIGHTS LICENSING DURING AUTHENTICATION SYSTEM DISRUPTIONS

(71) Applicant: Adobe Inc., San Jose, CA (US)

(72) Inventors: Andrian Cucu, Buchare (RO); Bogdan Motrogan, Buchare (RO); Marius Catalin Catana, Buchare (RO); Prafull Agarwal, Agra (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/383,719

(22) Filed: Jul. 23, 2021

(51) Int. Cl.
*G06F 21/10* (2013.01)
*H04L 9/08* (2006.01)
*H04L 9/32* (2006.01)

(52) U.S. Cl.
CPC ............ *G06F 21/10* (2013.01); *H04L 9/0825* (2013.01); *H04L 9/3213* (2013.01); *H04L 9/3228* (2013.01); *G06F 2221/0711* (2013.01); *H04L 2209/603* (2013.01)

(58) Field of Classification Search
CPC .. G06F 21/10; G06F 21/12; G06F 2221/0711; G06F 2221/0757; G06F 2221/0764; G06F 2221/0773; H04L 9/0825; H04L 9/3213; H04L 9/3228; H04L 2209/60; H04L 2209/603
See application file for complete search history.

(56) References Cited

U.S. PATENT DOCUMENTS

| | | | | |
|---|---|---|---|---|
| 5,579,222 A | * | 11/1996 | Bains | .................... G06Q 30/018 705/16 |
| 2012/0216289 A1 | * | 8/2012 | Kawaguchi | ............. G06F 21/10 726/26 |
| 2017/0024548 A1 | * | 1/2017 | Dorwin | ............... G06F 16/7867 |

* cited by examiner

Primary Examiner — Minh Dinh
(74) *Attorney, Agent, or Firm* — Keller Preece PLLC

(57) ABSTRACT

The present disclosure relates to systems, non-transitory computer-readable media, and methods for implementing asymmetric cryptography for digital rights licensing during system disruptions. In particular embodiments, the disclosed systems transmit, to a licensing device that issues digital licenses, a digital communication indicating a system outage of an identity server that verifies digital licenses of client devices. Based on the digital communication, the disclosed systems call a monitoring device using a licensing device identifier. In response to the call, one or more embodiments of the disclosed systems use the monitoring device to encrypt and transmit a verification token back to the licensing device. In certain implementations, the disclosed systems then verify the system outage by decrypting the encrypted verification token and validating a corresponding digital signature. Upon validation, the disclosed systems can trigger a failover mechanism for issuing a grace digital license to one or more client devices during the system outage.

20 Claims, 11 Drawing Sheets

US 11,568,026 B1

UTILIZING ENCRYPTED DIGITAL COMMUNICATIONS TO DYNAMICALLY SECURE DIGITAL RIGHTS LICENSING DURING AUTHENTICATION SYSTEM DISRUPTIONS

BACKGROUND

Recent years have seen increased adoption of software applications that utilize security and authentication protocols implemented across computer networks. For example, conventional verification systems utilize remote servers to issue and authenticate digital licenses for user devices to access and run software applications. Although conventional systems can implement digital software licenses protocols across computer networks, a number of problems exist with conventional verification systems. For example, during system disruptions, conventional systems are prone to deceptive digital communications that lead to insecure digital rights licensing and/or limited flexibility that inhibits user devices from efficiently accessing software applications.

BRIEF SUMMARY

Embodiments of the present disclosure provide benefits and/or solve one or more of the foregoing or other problems in the art with systems, non-transitory computer-readable media, and methods that implement asymmetric cryptography for system health checks and digital rights licensing during authentication system disruptions. For instance, upon detecting a disruption to an identity server that authenticates end user client devices, the disclosed systems can initiate an encrypted verification protocol for securely and efficiently issuing temporary grace licenses from software licensing devices. For example, the disclosed systems can register a plurality of software licensing devices with public cryptographic keys and then utilize these keys together with public-private key pairs corresponding to a monitoring device to verify system outages and issue grace licenses to client devices. To illustrate, in one or more embodiments the disclosed systems generate and transmit a verification token (e.g., a JSON web token) from the monitoring device to the software licensing device, where the verification token is encrypted using a public key of the software licensing device and signed using a private key corresponding to the monitoring device. In certain implementations, the software licensing device can verify the system outage by decrypting the encrypted verification token (e.g., using a private key for the software licensing device) and validating the digital signature for the encrypted verification token using a public key corresponding to the monitoring device. Upon validation, in one or more embodiments, the disclosed systems trigger a failover mechanism for issuing a grace digital license to one or more end user client devices during the system outage. In this manner, the disclosed systems can securely and efficiently issue digital licenses to client devices during system disruption events.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
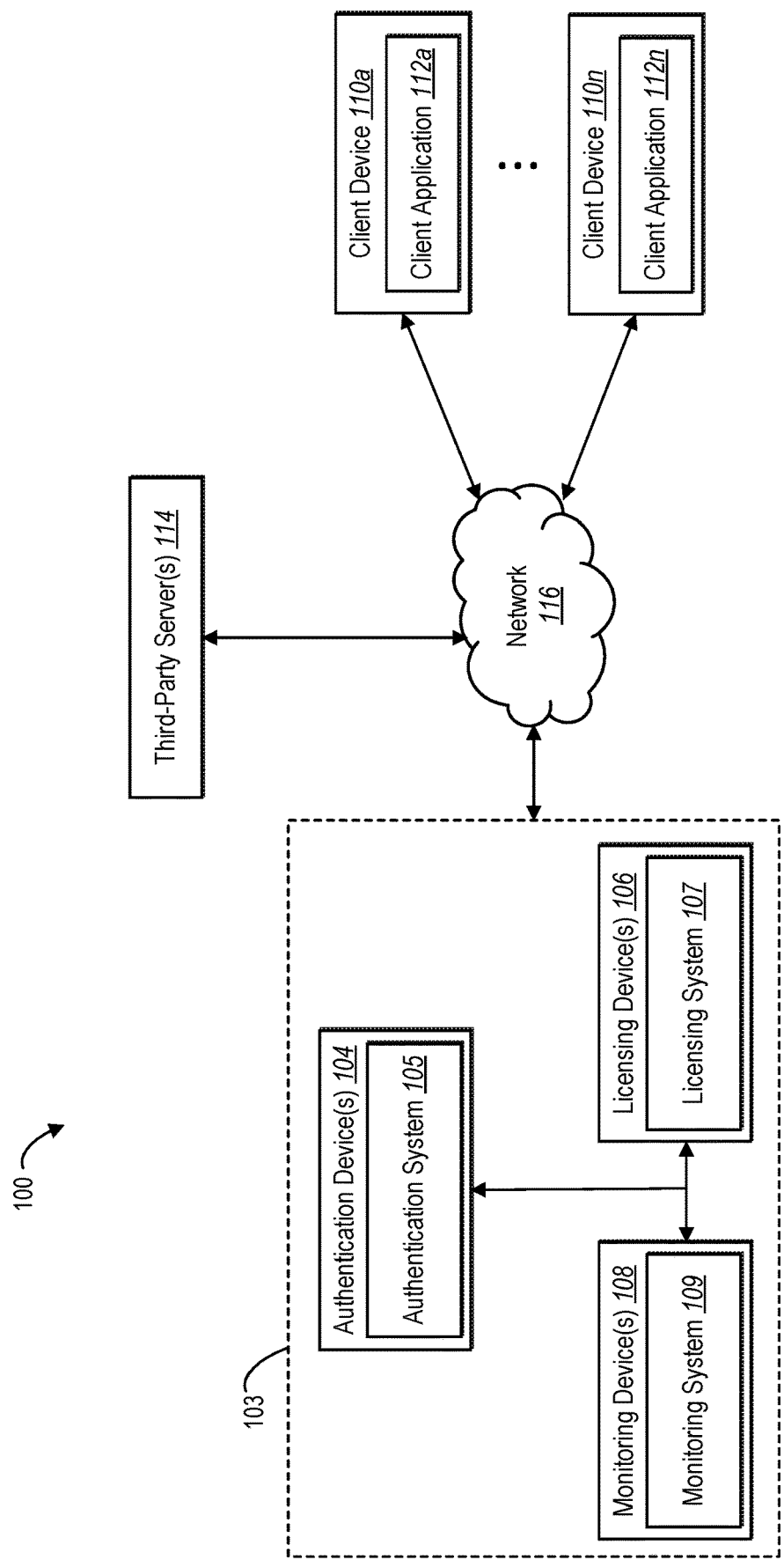
FIG. 1 illustrates a computing system environment for implementing a software management system in accordance with one or more embodiments.

One or more embodiments described herein include a software management system that uses encrypted verification tokens to securely, efficiently, and flexibly secure digital rights licensing across computer networks during authentication system disruptions. In particular embodiments, the software management system registers licensing devices in a microservice (e.g., a disruption registry) for receiving secure confirmation notifications when system disruptions to an authentication device occur. Using a monitoring device, the software management system detects disruptions to the authentication device. Upon detecting a disruption to the authentication device, in one or more embodiments the software management system provides requesting licensing devices in the disruption registry with encrypted confirmation notifications from the monitoring device that indicate digital information corresponding to the system disruption. In particular, the software management system generates an encrypted token utilizing a public key corresponding to a licensing device and signs the encrypted token utilizing a private key corresponding to the monitoring device. By transmitting this encrypted token to a licensing device, the software management system can securely and efficiently initiate a failover mechanism and issue temporary grace digital licenses from the licensing device to corresponding client devices. In this manner, the software management system can prevent abuse and security attacks during system disruptions while accurately and efficiently issuing grace digital licenses for continued operation of software applications across client devices.

As just mentioned, in one or more embodiments the software management system utilizes a monitoring device to generate a disruption registry and register licensing devices. For example, the software management system populates the disruption registry with licensing device identifiers and corresponding licensing device public keys. In some implementations, the software management system can utilize the disruption registry to efficiently and securely initiate a failover mechanism during a system disruption.

For example, when the authentication device experiences a disruption event, the monitoring device can transmit a digital notification (e.g., via one or more messaging queues) to indicate a system disruption has occurred. In turn, registered licensing devices can transmit, to the monitoring device, a verification request that includes a licensing device identifier. In response to this verification request, the software management system generates an encrypted verification token that securely confirms the system disruption. For example, the monitoring device uses the licensing device identifier within the verification request to identify a public key for the licensing device from the disruption registry.

Upon accessing a public key for the licensing device, in certain implementations the monitoring device then utilizes the identified public key to generate an encrypted verification token. In particular, the monitoring device can generate a token that includes details regarding the system disruption and the apply a cryptographic model with the public key to generate an encrypted token that can only be interpreted utilizing a private key associated with the licensing device. Utilizing this asymmetric encryption approach, the software management system can prohibit imposter communications from triggering transmission of digital licenses to client devices.

Additionally, in some embodiments, the monitoring device digitally signs the encrypted verification token. For example, in one or more embodiments, the monitoring device uses a private key of the monitoring device to generate a digital signature for the encrypted verification token. This private key is paired with a public key accessible to licensing devices. Accordingly, utilizing this private-public key pairing, the software management system can verify that an encrypted token originates from the monitoring device and further ensure the security of the encrypted token and its contents.

In some implementations, the monitoring device transmits the encrypted verification token to the licensing device for decryption and validation. In particular, the licensing device decrypts the encrypted verification token by utilizing the private key corresponding to the licensing device. Additionally, in certain implementations, the licensing device downloads a public key for the monitoring device to validate the digital signature. Accordingly, the licensing device verifies the source of the encrypted verification token while also maintaining the privacy and security of the encrypted contents.

Subsequently, in one or more embodiments, the software management system issues one or more grace licenses to client device(s) based on decrypting and validating the encrypted verification token. For example, the licensing device issues temporary licenses to one or more client devices during a grace time period (e.g., during the disruption event while the authentication device is offline or otherwise unable to operate). In particular embodiments, the temporary licenses expire at the end of the grace time period. In other embodiments, the licensing device revokes the grace digital license(s) in response to determining the system disruption has been resolved.

As mentioned above, a number of problems exist with conventional verification and licensing systems, particularly with regard to digital security and/or flexibility of implementing systems. For example, some conventional verification systems multiplex notifications regarding authentication status (e.g., system downtime). However, these multiplexed notifications (or other notifications) can be easily manipulated to hack conventional licensing systems into providing digital rights to client devices that are not authorized to receive such digital rights for a software application. Accordingly, conventional systems are often insecure and vulnerable to fraudulent cyberactivity.

In addition, some conventional licensing systems inflexibly discontinue access to and/or functionality of a software application during a disruption event (e.g., when a verification system is unable to operate). This rigid approach prevents authorized client devices from using the software application and often leads client devices to seek other digital solutions. Some conventional verification systems defer authentication to third-party servers during disruption events. However, third-party authentication is often less reliable and exposes sensitive data to external/uncontrolled data security risks.

In contrast, the software management system can improve digital security and system flexibility during system disruptions. For example, the software management system can reduce or eliminate fraudulent authorizations for digital rights to software applications by using encrypted verification tokens. To illustrate, the software management system can improve digital security by encrypting a verification token using public keys for corresponding licensing devices. In turn, only the licensing device as the designated recipient can decrypt the encrypted verification token using a corresponding private key of the specific licensing device. As an added layer of digital security, the software management system can also utilize digital signatures. For example, a monitoring device of the software management system can digitally sign an encrypted verification token using a private key of the monitoring device. Licensing devices of the software management system can subsequently use a public key of the monitoring device to validate the digital signature. Further, in certain implementations, the encrypted verification token is valid only for single-use verification. In this manner, the software management system can utilize multiple layers of digital security to reduce or eliminate data security risks in a digital rights licensing workflow.

In addition, the software management system can improve system flexibility by continuing to issue grace digital licenses during a system disruption. Specifically, the software management system can securely issue temporary digital licenses during system disruptions unlike conventional systems that halt access/use of software applications. For example, the software management system triggers a grace digital license failover mechanism in response to secure decryption and validation of an encrypted verification token and digital signature. Moreover, the software management system does not require third-party authentication like some conventional systems. Accordingly, the software management system flexibly and securely issues grace digital licenses despite system disruptions to an authentication device.

Additional detail will now be provided regarding the software management system in relation to illustrative figures portraying example embodiments and implementations of the software management system. For example, FIG. 1 illustrates a computing system environment (or "environment") 100 for implementing a software management system 103 in accordance with one or more embodiments. As shown in FIG. 1, the environment 100 includes the software management system 103, client devices 110a-110n, third-party server(s) 114, and a network 116. Each of the components of the environment 100 communicate (or are at least configured to communicate) via the network 116, and the network 116 may be any suitable network over which computing devices can communicate. Example networks are discussed in more detail below in relation to FIG. 6.

Moreover, as shown in FIG. 1, the software management system 103 uses authentication device(s) 104, licensing device(s) 106, and/or monitoring device(s) 108 to perform a variety of acts and algorithms in relation to digital rights and/or a grace digital license failover mechanism. Indeed, the software management system 103 can be implemented in whole or in part across a single device, each device, or a subset of devices comprising the authentication device(s) 104, the licensing device(s) 106, and/or the monitoring device(s) 108.

Figure 6:
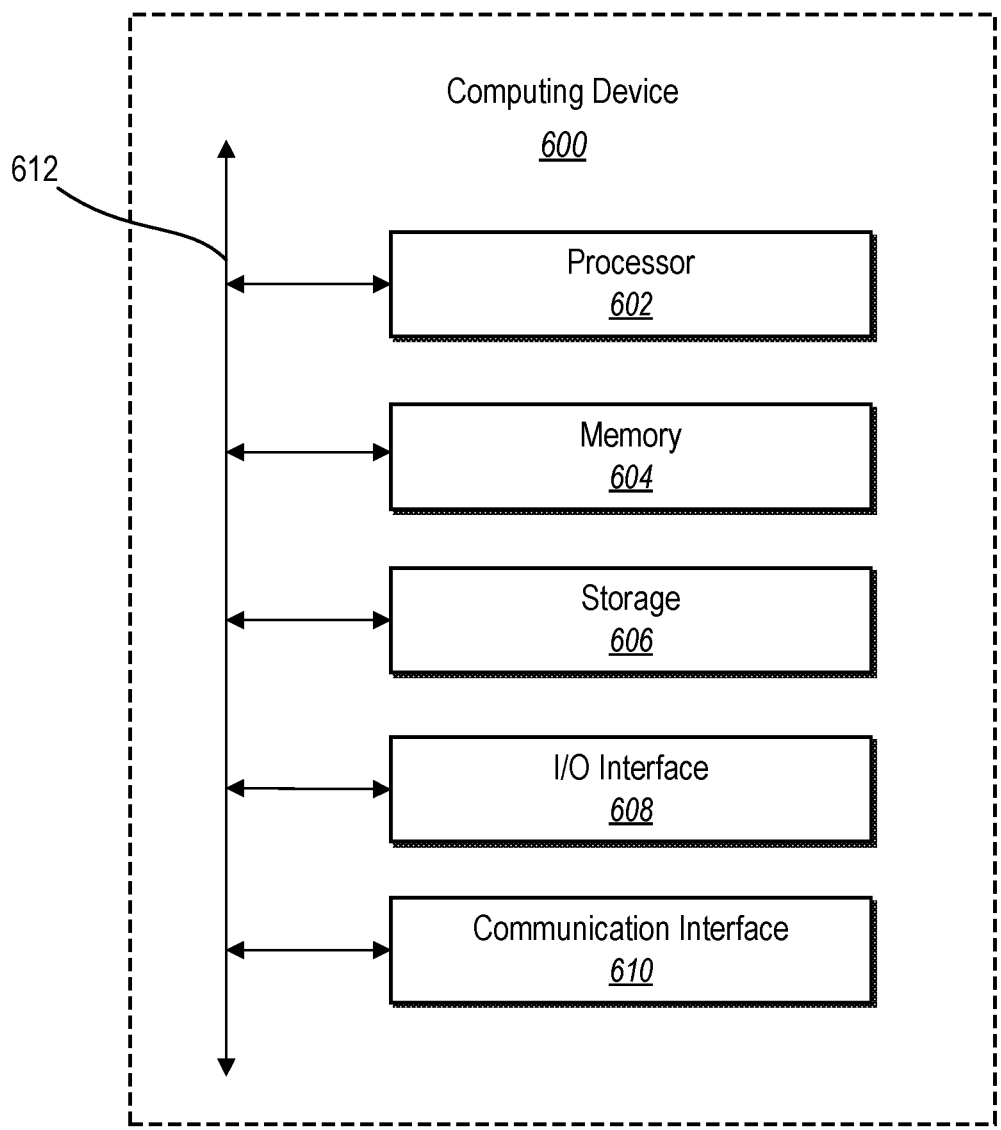
FIG. 6 illustrates a block diagram of an example computing device for implementing one or more embodiments of the present disclosure.

The authentication device(s) 104, the licensing device(s) 106, and the monitoring device(s) 108 can include one or more of a variety of computing devices, including a server, desktop computer, laptop computer, smartphone, tablet, smart television, virtual reality device, augmented reality device, or other computing device as described in relation to FIG. 6. Moreover, although FIG. 1 illustrates a single device for each of the authentication device(s) 104, the licensing device(s) 106, and the monitoring device(s) 108, it will be appreciated that these devices can include a plurality of devices (e.g., a plurality of servers, servers and desktop computers, desktop computers and laptops, etc.).

Further illustrated in FIG. 1, the authentication device(s) 104, the licensing device(s) 106, and the monitoring device(s) 108 respectively implement an authentication system 105, a licensing system 107, and the monitoring system 109. In particular embodiments, the authentication system 105, the licensing system 107, and the monitoring system 109 comprise a web application, a native application installed on the respective device (e.g., a mobile application, a desktop application, etc.), or a cloud-based application where part of the functionality is performed by the software management system 103 and/or an implementing server. In some embodiments, the authentication system 105, the licensing system 107, and the monitoring system 109 cause the implementing devices (the authentication device(s) 104, the licensing device(s) 106, and the monitoring device(s) 108, respectively) to perform the acts or algorithms of this disclosure.

In some embodiments, the monitoring device(s) 108 generates a disruption registry comprising public keys corresponding to private keys of the licensing device(s) 106. The monitoring device(s) 108 can also determine that the authentication device(s) 104 is experiencing system disruptions (e.g., in response to detecting anomalies in system metrics for the authentication device(s) 104). Upon identifying a disruption at the authentication device(s) 104 that inhibits digital rights licensing to one or more of the client devices 110a-110n, the software management system 103 uses the monitoring device(s) 108 to perform various acts.

For example, the monitoring device(s) 108 encrypts a verification token indicating the disruption utilizing the public key of a licensing device from the disruption registry. Additionally, for instance, the monitoring device(s) 108 digitally signs the encrypted verification token utilizing a private key corresponding to the monitoring device(s) 108. Further, in some embodiments, the monitoring device(s) 108 transmits, to the licensing device(s) 106, the encrypted verification token such that the licensing device(s) 106 can verify the disruption utilizing the private key of the licensing device(s) 106 and a public key corresponding to the monitoring device(s) 108 to trigger a grace digital license failover mechanism for one or more of the client devices 110a-110n.

In addition, the licensing device(s) 106 can verify a disruption inhibiting authentication of digital rights licensing to one or more of the client devices 110a-110n utilizing an encrypted verification token. For example, the licensing device(s) 106 can, in response to transmitting a verification request to the monitoring device(s) 108, receive the encrypted verification token generated utilizing the public key corresponding to the licensing device(s) 106 and signed utilizing a private key corresponding to the monitoring device(s) 108. Further, in certain implementations, the licensing device(s) 106 decrypts the encrypted verification token utilizing the private key corresponding to the licensing device(s) 106. Additionally, in some embodiments, the licensing device(s) 106 identifies a public key corresponding to the monitoring device(s) 108 to verify that the monitoring device(s) 108 digitally signed the encrypted verification token. In turn, the licensing device(s) 106 can issue a grace digital license to one or more of the client devices 110a-110n in response to verifying the disruption utilizing the encrypted verification token.

As shown in FIG. 1, the environment 100 includes the client devices 110a-110n. The client devices 110a-110n can include one of a variety of computing devices, including a smartphone, tablet, smart television, desktop computer, laptop computer, virtual reality device, augmented reality device, or other computing device as described in relation to FIG. 6. Although FIG. 1 illustrates multiple client devices, in some embodiments the environment 100 includes only a single client device. In these or other embodiments, the client devices 110a-110n further communicate with the software management system 103 via the network 116. For example, the client devices 110a-110n receive user input for accessing a software application. In accordance with a corresponding grace digital license from the software management system 103, the client devices 110a-110n can then access and/or use the software application for a period of time.

As shown, the client devices 110a-110n includes client applications 112a-112n. In particular embodiments, the client applications 112a-112n comprise a web application, a native application installed on the client devices 110a-110n (e.g., a mobile application, a desktop application, etc.), or a cloud-based application where part of the functionality is performed by the software management system 103 and/or an implementing server. In some embodiments, the client applications 112a-112n present or display information to a user associated with the client devices 110a-110n, including user interfaces for a software application accessed via one or more grace digital licenses.

Further, the environment 100 includes the third-party server(s) 114. In some embodiments, the third-party server(s) 114 includes a disruption detection server. For example, the third-party server(s) 114 includes one or more computing devices that monitor metrics of the authentication device(s) 104.

In some embodiments, though not illustrated in FIG. 1, the environment 100 has a different arrangement of components and/or has a different number or set of components altogether. For example, in certain embodiments, the client devices 110a-110n communicate directly with the software management system 103, bypassing the network 116. As another example, the software management system 103 includes one or more databases (e.g., for storing a disruption registry comprising licensing device identifiers and corresponding public keys).

Also not illustrated in FIG. 1, in some embodiments, the environment 100 includes one or more servers that implement the software management system 103. In particular embodiments, the one or more servers comprise a content server and/or a data collection server. Additionally or alternatively, the one or more servers comprise an application server, a communication server, a web-hosting server, a social networking server, or a digital content management server.

Figure 2:
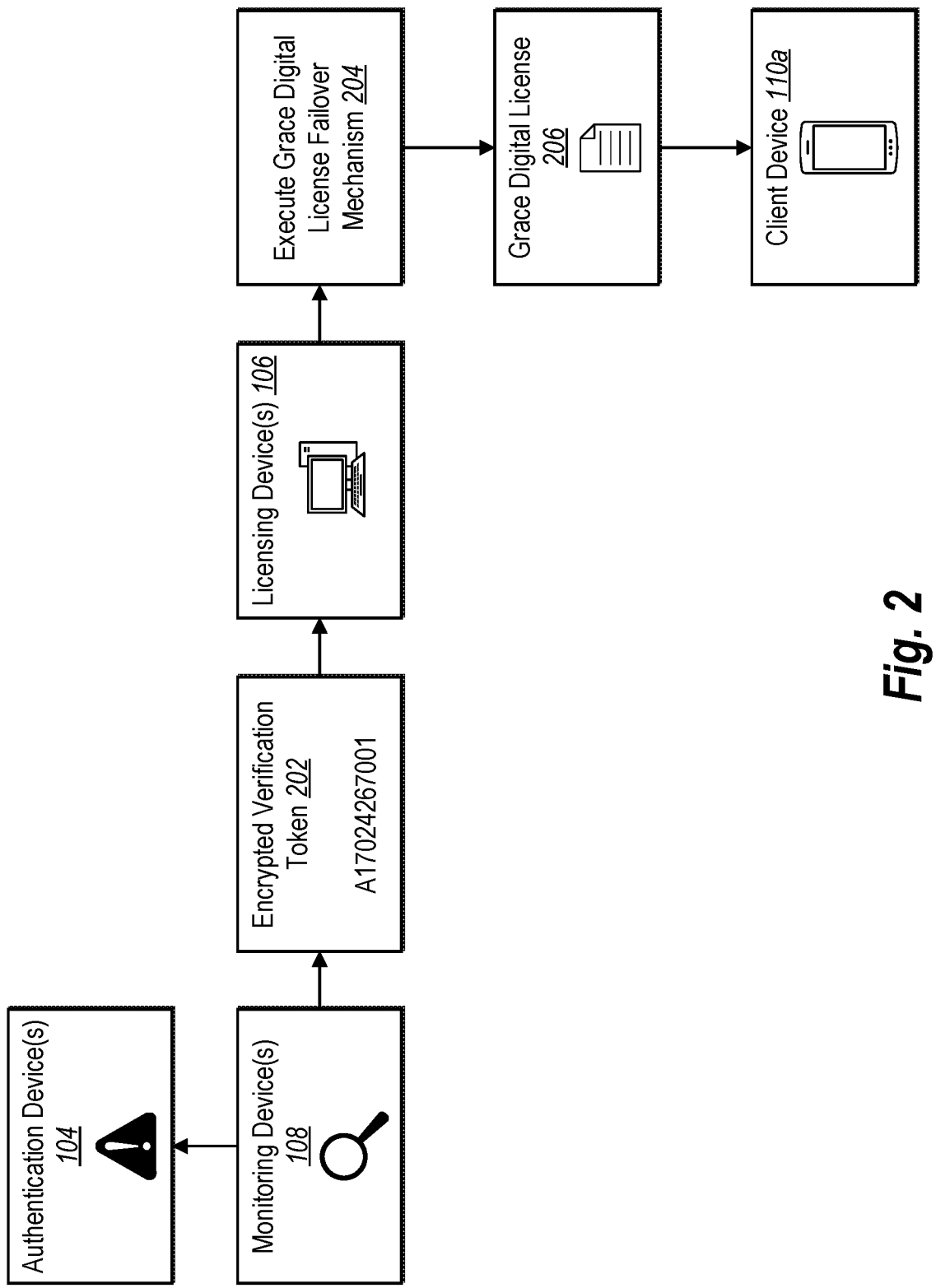
FIG. 2 illustrates a software management system using an encrypted verification token to trigger a grace digital license failover mechanism in accordance with one or more embodiments.

As mentioned above, the software management system 103 can provide secure communications for executing a grace digital license failover mechanism. FIG. 2 illustrates the software management system 103 using an encrypted verification token to trigger a grace digital license failover mechanism in accordance with one or more embodiments. As shown in FIG. 2, the monitoring device(s) 108 generates an encrypted verification token 202 for transmitting to the licensing device(s) 106.

As mentioned above, an authentication device includes a computing device that authenticates, identifies, approves, or authorizes a user or client device. In particular embodiments, an authentication device authenticates, approves, or authorizes digital rights for accessing and/or using a software application on a client device. For example, an authentication device verifies the login credentials and/or identity of a client device In some circumstances, the authentication device(s) 104 experiences one or more disruptions (as indicated via the warning icon in FIG. 2). For example, a disruption includes a digital interference or digital interruption that inhibits digital rights licensing to one or more client devices. In particular embodiments, a disruption prevents an authentication device from authenticating, identifying, approving, or authorizing digital rights for one or more client devices to access and/or use a software application. One example of a disruption includes a verification runtime error (e.g., errors caused by invalid functions, incorrect call handles, missing files, memory leaks, open loops, too many or too large of inputs). Another example of a disruption includes a system outage (e.g., an outage caused by a power outage, server reset, bandwidth overload, internet or network outage, equipment failure, storage failure, application error). Yet another example of a disruption includes a maintenance update (e.g., a time during which an authentication device is offline for receiving device resets, physical maintenance, new development, code-debugging, patch updates, testing, scaling, recompiling).

In response to detecting a disruption at the authentication device(s) 104, the monitoring device(s) 108 generates an encrypted verification token 202. For example, an encrypted verification token includes a digitally protected communication. In particular, an encrypted verification token can include one or more coded portions of a digital message that are encoded and decoded using one or more encryption algorithms. Example encrypted verification tokens include digital messages encrypted using asymmetric cryptographic algorithms that leverage a combination of public keys and private keys. Other examples of encrypted verification tokens include digital messages encrypted using symmetric cryptographic algorithms.

Moreover, in certain implementations, an encrypted verification token includes disruption-token data corresponding to at a disruption. In particular embodiments, disruption-token data can include an estimated duration of the disruption (e.g., a length of time that the disruption is expected to last). As another example, the disruption-token data can include a length of time during which an encrypted verification token is valid (e.g., a validation time window). In yet another example, the disruption-token data includes a list of one or more public keys of a monitoring device to validate a digital signature of the encrypted verification token (e.g., accepted public keys).

Further, in some embodiments, an encrypted verification token includes a digital signature. For example, a digital signature can include a cryptographic code or signal that verifies the sender, author, or signatory of a digital file. In particular embodiments, a digital signature comprises signature-related data that is encrypted and decrypted using public and private keys. For example, a digital signature comprises signature-related data encrypted with a private key of the monitoring device and decrypted with a public key of the monitoring device.

Relatedly, the term key in cryptography includes digital data utilized to encrypt or decrypt a digital message. An implementing computing device can encode or decode cryptographic data by processing a key in conjunction with a cryptographic algorithm. Keys can be utilized in pairs—a public key that is often available to other devices for distribution or download, and a private key that is held in confidence. One key can be utilized to encrypt a digital communication with the other key pair being used to decrypt the digital communication.

Returning to the illustration of FIG. 2, the monitoring device(s) 108 transmits the encrypted verification token 202 to the licensing device(s) 106 based on identifying a disruption. As mentioned above, a licensing device can include a computing device that performs digital rights licensing for a software application (e.g., for a virtual product or virtual service). For example, a licensing device can transmit, provide, disseminate, or share digital rights licenses or privileges to one or more client devices. In some embodiments, a licensing device comprises one or more computing devices that issue digital licenses after a client device or user is authenticated or verified by an authentication device. In other embodiments, a licensing device comprises one or more computing devices that issue grace digital licenses (e.g., temporary digital licenses) to one or more client devices despite an authentication device experiencing a disruption.

In particular, the licensing device(s) 106 decrypts encrypted verification token 202 received from the monitoring device(s) 108 associated with an identified disruption. Additionally, in some embodiments, the licensing device(s) 106 validates a digital signature corresponding to encrypted verification token 202. By decrypting and validating encrypted verification token 202, the licensing device(s) 106 can verify that a disruption indeed exists at the authentication device(s) 104.

At an act 204, the licensing device(s) 106 executes a grace digital license failover mechanism in response to decrypting and validating the encrypted verification token 202. For example, a grace digital license failover mechanism can include one or more acts for issuing a grace digital license when an authentication device experiences a disruption. In particular embodiments, a grace digital license failover mechanism can include issuing a grace digital license that is valid for a temporary period of time (e.g., a predetermined period of time or a period of time expiring upon resolution of the disruption). For example, a grace digital license failover mechanism comprises issuing a grace digital license in response to a client device attempting to activate or launch a software application corresponding to the grace digital license.

Indeed, as shown in FIG. 2, the act 204 comprises the licensing device(s) 106 transmitting a grace digital license 206 to the client device 110a. In turn, the client device 110a can use the software application according to entitlements and digital rights outlined in the grace digital license 206.

As discussed above, the software management system 103 utilizes a monitoring device and a licensing device for securing communications regarding a disruption and triggering a grace digital license failover mechanism. FIGS. 3A-3E illustrate components of the software management system 103 performing acts in relation to a grace digital license failover mechanism in accordance with one or more embodiments.

Figure 3A:
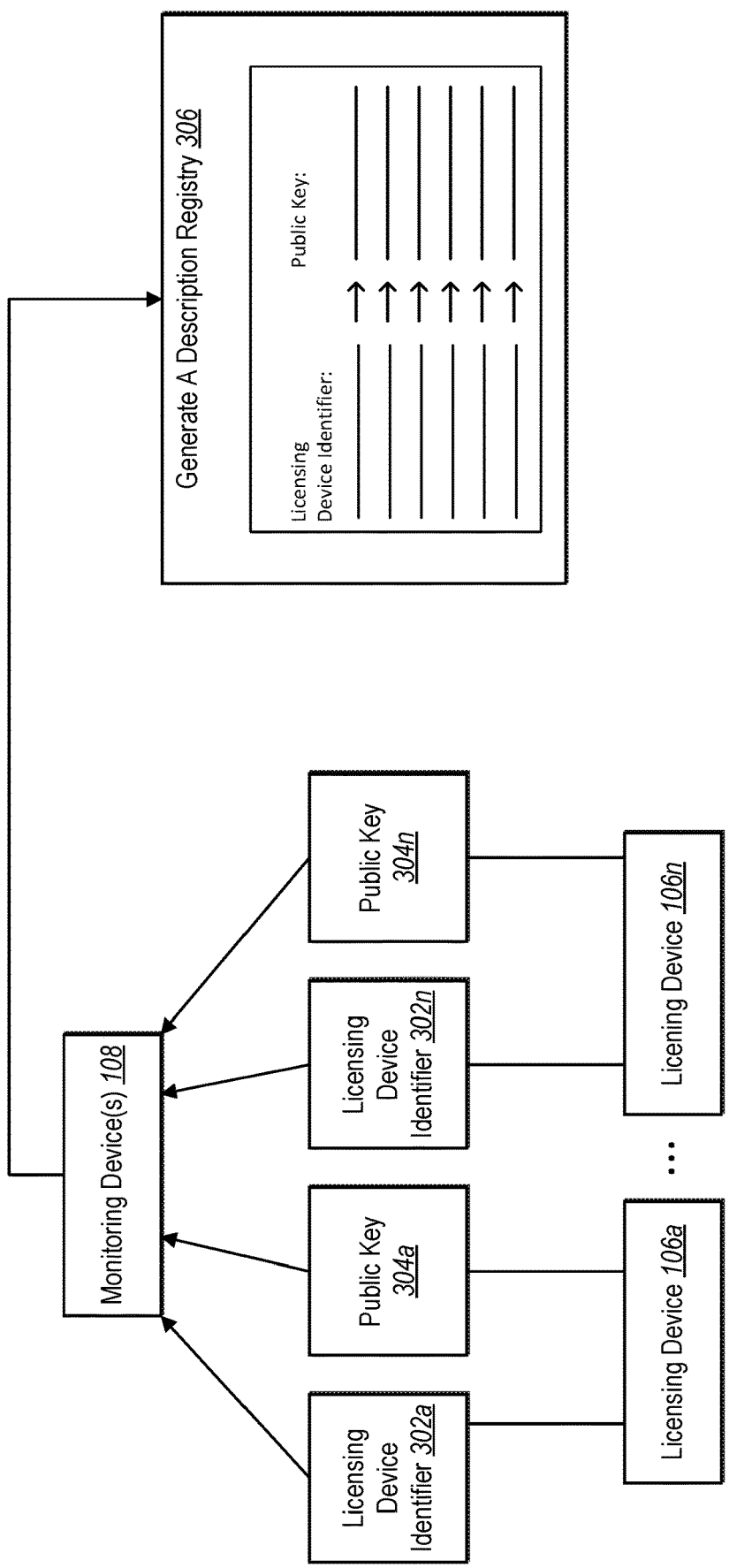
FIGS. 3A-3E illustrate components of a software management system performing acts in relation to a grace digital license failover mechanism in accordance with one or more embodiments.

For example, FIG. 3A illustrates a monitoring device generating a disruption registry in registering one or more licensing devices. As shown in FIG. 3A, licensing devices 106a-106n provide corresponding licensing device identifiers 302a-302n to the monitoring device(s) 108. For example, a licensing device identifier can include one or more alphanumeric values that identify a licensing device or corresponding licensing account. In particular embodiments, a licensing device identifier includes a digital label uniquely assigned to a licensing device or corresponding licensing account. For example, a licensing device identifier can include one or more of a username, email address, phone number, serial number, employee number, department code, workstation number, etc.

In some embodiments, the licensing devices 106a-106n register with the monitoring device(s) 108 by transmitting the licensing device identifiers 302a-302n via a digital communication. For example, the licensing devices 106a-106n provide, via a registration user interface, one or more user inputs indicating the licensing device identifiers 302a-302n. As another example, the licensing devices 106a-106n email, upload, or digitally transfer the licensing device identifiers 302a-302n to the monitoring device(s) 108.

As shown in FIG. 3A, the licensing devices 106a-106n also provide public keys 304a-304n to the monitoring device(s) 108. As mentioned previously, a public key is a specific encryption key that can be distributed to other client devices for implementing asymmetric encryption processes. Accordingly, the licensing devices 106a-106n provide the public keys 304a-304n that correspond to each licensing device. This can be achieved in a variety of ways discussed above. For example, the licensing devices 106a-106n provide the public keys 304a-304n to the monitoring device(s) 108 via a registration user interface, email, upload, or other digital transfer.

Additionally or alternatively, in certain implementations, the monitoring device(s) 108 retrieves or requests one or more of the licensing device identifiers 302a-302n or the public keys 304a-304n. For example, the monitoring device(s) 108 provides, for display on the licensing devices 106a-106n, one or more user interface prompts or digital notifications requesting submission of one or more of the licensing device identifiers 302a-302n or the public keys 304a-304n. As another example, the monitoring device(s) 108 retrieves, from a database (e.g., a storage/memory device), one or more of the licensing device identifiers 302a-302n or the public keys 304a-304n.

At an act 306, the monitoring device(s) 108 generates a disruption registry. As used herein, the term disruption registry refers to a data structure for storing information utilized during a disruption. In particular embodiments, a disruption registry includes a data structure for generating secure communications regarding a disruption at the authentication device(s) 104. For example, a disruption registry includes one or more of tables, lists, directories, vectors, etc. that comprise licensing device identifiers and public keys corresponding to licensing devices to be securely notified of a disruption to an authentication device.

More specifically at the act 306, the monitoring device(s) 108 uses the licensing device identifiers 302a-302n and the public keys 304a-304n to generate the disruption registry. To do so, the software management system 103 can implement a variety of different approaches. In some embodiments, the monitoring device(s) 108 generates the disruption registry by populating specific portions of the disruption registry comprising entry fields, rows, columns, cells, or vector components. For example, the monitoring device(s) 108 populates specific portions of the disruption registry with the licensing device identifiers 302a-302n and the public keys 304a-304n received from the licensing devices 106a-106n. As another example, the monitoring device(s) 108 populates specific portions of the disruption registry with indexed values or reference call functions that map to the actual licensing device identifiers 302a-302n and the public keys 304a-304n stored within a storage database (e.g., a digitally protected storage database).

Figure 3B:
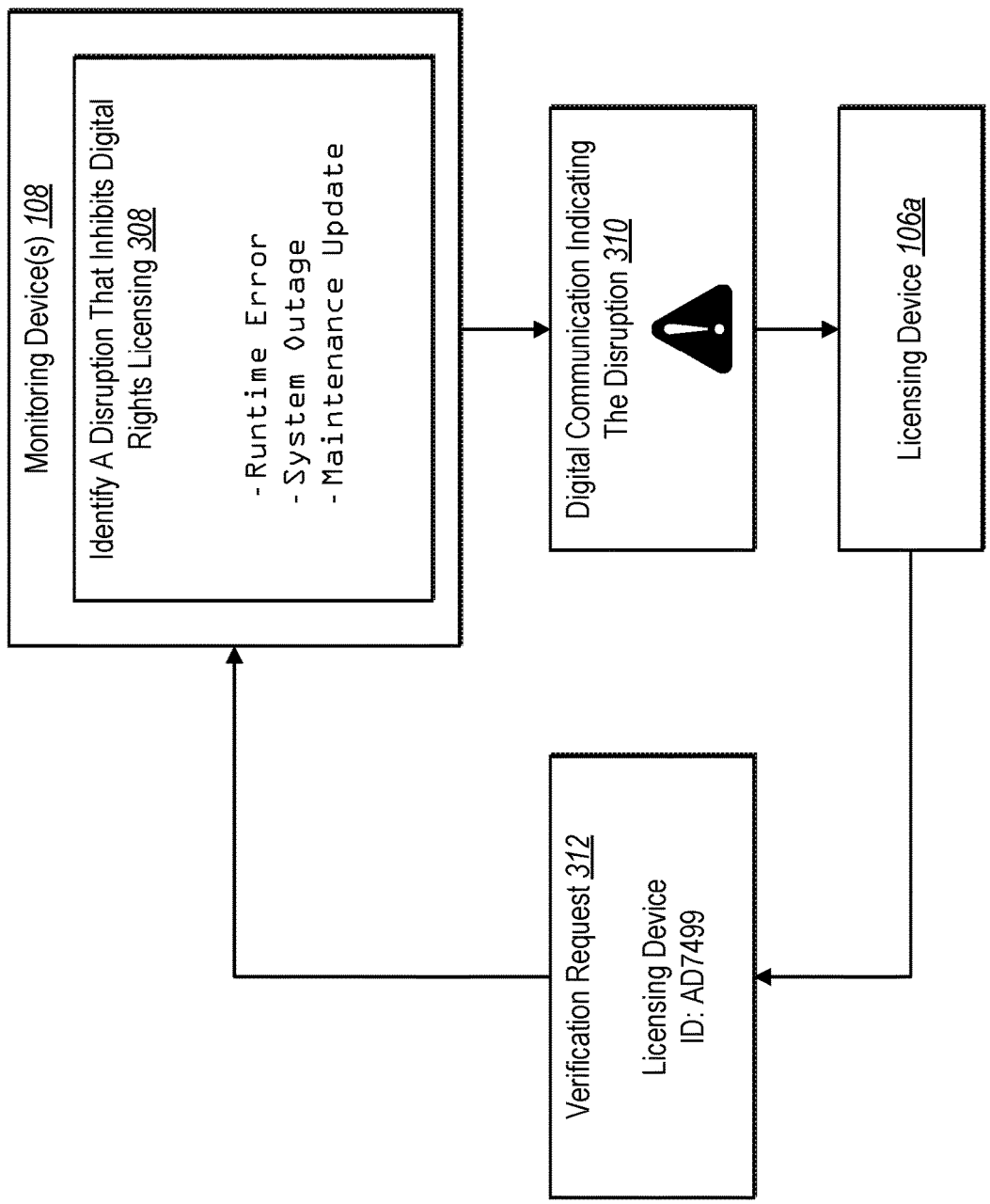

At an act 308 shown in FIG. 3B, the monitoring device(s) 108 identifies a disruption that inhibits digital rights licensing. In some embodiments, the monitoring device(s) 108 identifies the disruption based on one or more digital notifications or digital metrics from a third-party server. For example, the monitoring device(s) 108 receives one or more notifications or metrics from the third-party server that indicate a runtime error, a system outage, or a maintenance update.

In other embodiments, the software management system 103 uses the monitoring device(s) 108 to identify the disruption by monitoring one or more system metrics. For instance, in certain implementations, the monitoring device(s) 108 monitors time-series data (e.g., time-stamped data) of the authentication device(s) 104. In further implementations, the monitoring device(s) 108 monitors counter data that represents, for example, a number of requests served, tasks completed, or errors detected. In other implementations, the monitoring device(s) 108 monitors gauge data that represents measured values like temperature, current memory usage, or a number of outstanding requests. As additional examples, the monitoring device(s) 108 monitors histogram data (e.g., measured instances like request durations or response sizes) in relation to configurable buckets or bins of data and/or in relation to a sliding time window.

Based on identifying the disruption, the monitoring device(s) 108 transmits a digital communication 310 indicating the disruption to the licensing device 106a. In one or more embodiments, the digital communication 310 comprises a request, reply, error message, or digital information (e.g., details that relate to system metrics described above). In other embodiments, the monitoring device(s) 108 generates the digital communication 310 but excludes certain details regarding the disruption (e.g., disruption data) for security purposes.

In some embodiments, the monitoring device(s) 108 provides the digital communication 310 to the licensing device 106a via a variety of different health-check endpoints. To illustrate, the monitoring device(s) 108 provides the digital communication 310 to the licensing device 106a via one or more messaging queues to which the licensing device 106a subscribes (e.g., requests alerts). As used herein, the term messaging queue refers to a communication platform between system components of a network architecture. In particular embodiments, a messaging queue stores topic-based messages until processed by one or more computing devices (e.g., until the licensing device 106a retrieves the digital communication from the messaging queue). Example messaging queues include a disruption queue, a product-based queue, a service-based queue, a department queue, etc.

As other examples, the health-check endpoints can include email, SMS messaging, fax communications, digital support tickets, etc. For example, the licensing device 106a may receive the digital communication 310 by receiving an auto-generated email from an email address corresponding to the monitoring device(s) 108.

After receiving the digital communication 310, the licensing device 106a provides a verification request 312 to the monitoring device(s) 108. As used herein, the term verification request refers to a request for a monitoring device to verify a disruption at an authentication device. In particular embodiments, a verification request comprises a digital identifier for identifying, within a disruption registry, a licensing device that sent the verification request. Additionally, for example, the verification request comprises a digital identifier for identifying, within a disruption registry, a public key that corresponds to the licensing device. For instance, a verification request may include a digital identifier "AD7499" as shown in FIG. 3B such that the verification request 312 identifies the licensing device 106a as the sender of the verification request 312.

The licensing device 106a can provide the verification request 312 to the monitoring device(s) 108 in a variety of ways. In some embodiments, the licensing device 106a provides the verification request 312 to the monitoring device(s) 108 in a same or similar way as previously described above for the digital communication 310. For example, the licensing device 106a provides the verification request 312 to the monitoring device(s) 108 via one or more health-check endpoints comprising a messaging queue, email, SMS messaging, fax communications, digital support ticket communications, etc.

Figure 3C:
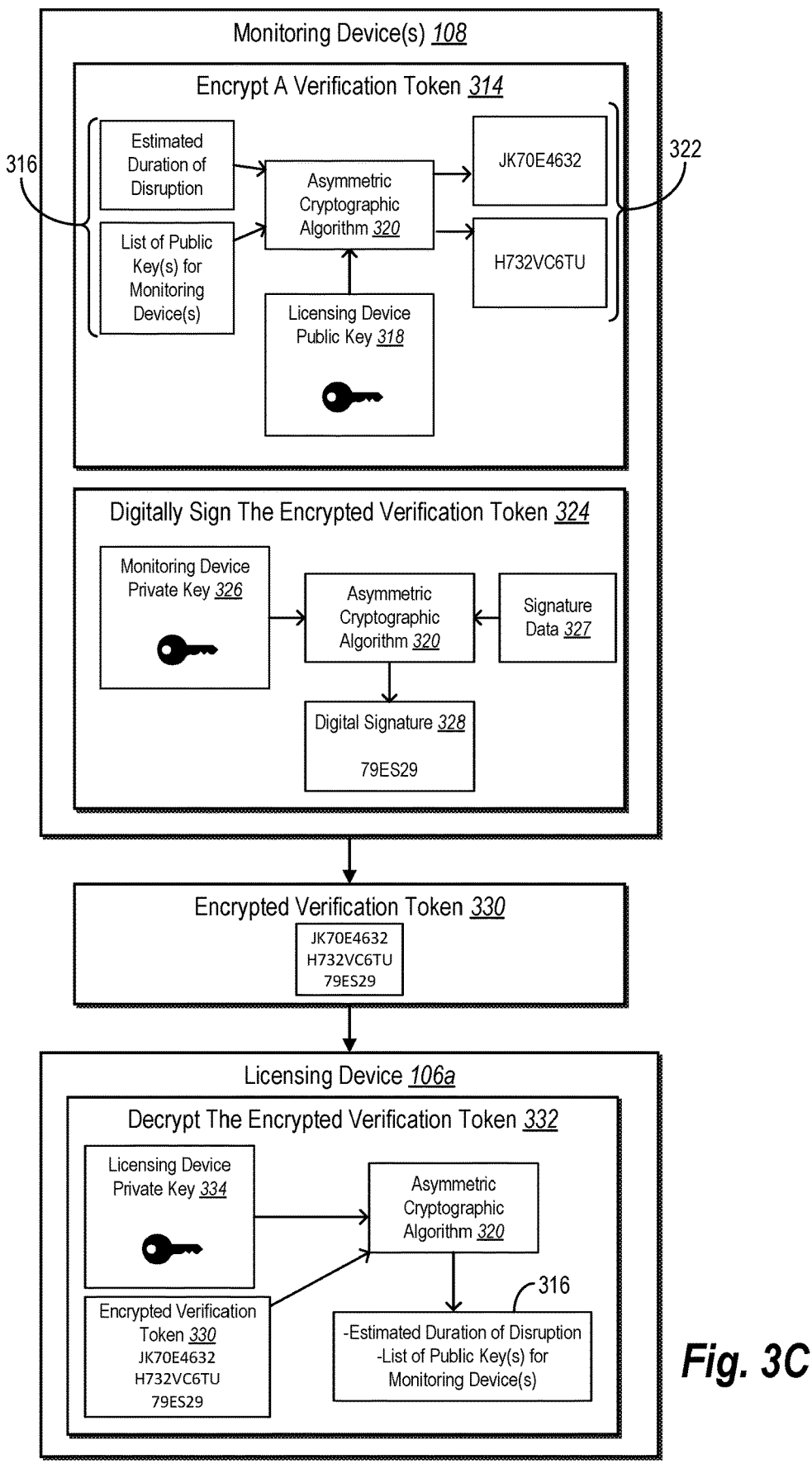

At an act 314 in FIG. 3C, the monitoring device(s) 108 encrypts a verification token that includes disruption-token data 316. The disruption-token data 316 describes a variety of different elements corresponding to the disruption, the verification token, or both. For example, in one or more embodiments, the disruption-token data 316 indicates an estimated duration of the disruption (e.g., a maintenance update is expected to cause the authentication device(s) 104 to be down from about 1:00 am to 3:00 am on June 1). As another example, the disruption-token data 316 indicates a length of time during which an encrypted verification token is valid (e.g., this verification token is valid for single-use verification for the next 72 hours or until the disruption is resolved). In yet another example, the disruption-token data 316 comprises a list of one or more public keys for the monitoring device(s) 108 that can be used to decrypt the verification token.

To encrypt the verification token, the monitoring device(s) 108 identifies a licensing device public key 318. For example, the monitoring device(s) 108 identifies the licensing device public key 318 of the licensing device 106a by retrieving the public key from the disruption registry based on the licensing device identifier provided in the verification request 312. To illustrate, in some instances, the monitoring device(s) 108 identifies the licensing device public key 318 by extracting data contents from a cell or entry field in the disruption registry that corresponds to the licensing device identifier of the licensing device 106a. In other instances, the monitoring device(s) 108 identifies the licensing device public key 318 by executing a call function in the disruption registry that corresponds to the licensing device identifier of the licensing device 106a.

FIG. 3C further shows the monitoring device(s) 108 utilizing an asymmetric cryptographic algorithm 320 to generate encrypted portions 322 of the verification token. The monitoring device(s) 108 can use myriad different algorithms for the asymmetric cryptographic algorithm 320. For example, the asymmetric cryptographic algorithm 320 may include one or more of the JSON Web Token internet standard, JSON Web Signature, JSON Web Encryption, Diffie-Hellman key exchange protocol, Digital Signature Standard (which incorporates the Digital Signature Algorithm), ElGamal, elliptic-curve cryptography, Paillier cryptosystem, Rivest-Shamir-Adleman encryption algorithm (e.g., PKCS #1), Cramer-Shoup cryptosystem, YAK authenticated key agreement protocol, NTRUEncrypt cryptosystem, McEliece cryptosystem, Merkle-Hellman knapsack cryptosystem, or various password-authenticated key agreement techniques.

In particular embodiments, the monitoring device(s) 108 uses the asymmetric cryptographic algorithm 320 to encrypt the disruption-token data 316. For example, the monitoring device(s) 108 processes the disruption-token data 316 using both of the asymmetric cryptographic algorithm 320 and the licensing device public key 318 to generate the encrypted portions 322 of the verification token.

At an act 324, the monitoring device(s) 108 digitally signs the encrypted verification token. To do so, the monitoring device(s) 108 processes signature data 327. The signature data 327 can include a variety of digital elements that help confirm the monitoring device(s) 108 is indeed the authentic sender. For example, the signature data 327 may include an electronic signature, digital message, code word, alias, etc. for providing a layer of digital security in addition to the encrypted portions 322.

As shown, the monitoring device(s) 108 generates a digital signature 328 based on the signature data 327. In particular embodiments, the monitoring device(s) 108 generates the digital signature 328 by processing the signature data 327 using a monitoring device private key 326 that corresponds to the monitoring device(s) 108 and the asymmetric cryptographic algorithm 320. By using the monitoring device private key 326 for the monitoring device(s) 108, the software management system 103 adds further digital safeguards against fraudulent digital communications from other devices. Moreover, it can be appreciated that the asymmetric cryptographic algorithm 320 for generating the digital signature 328 can be the same algorithm used at the act 314, or a different asymmetric cryptographic algorithm.

Based on the act 314 and the act 324, the monitoring device(s) 108 generates an encrypted verification token 330 for transmitting to the licensing device 106a. In one or more embodiments, the encrypted verification token 330 comprises a combination of the encrypted portions 322 and the digital signature 328. For instance, in FIG. 3C, the encrypted verification token 330 comprises "JK70E4632" and "H732VC6TU" corresponding to the encrypted portions 322 and "79ES29" corresponding to the digital signature 328.

Alternatively, in some embodiments, the encrypted verification token 330 comprises a different variation of the encrypted portions 322 or the digital signature 328. For example, in certain implementations, the encrypted verification token 330 comprises a combination of non-encrypted data and encrypted data. To illustrate, the encrypted verification token 330 can include the disruption-token data 316 (non-encrypted) and the digital signature 328 (encrypted). As another example, in some instances, the encrypted verification token 330 comprises the encrypted portions 322 but not the digital signature 328.

In specific implementations, the monitoring device(s) 108 generates the encrypted verification token 330 for secure transmission via a particular mode of communication. For example, in some embodiments, the monitoring device(s) 108 generates the encrypted verification token 330 as a JSON web token for secure transmission via the Internet. Additional security protocols can also increase security of transmission and/or use of the encrypted verification token 330. For example, in one or more embodiments, the monitoring device(s) 108 generates the encrypted verification token 330 for single-use verification only such that encrypted verification tokens cannot be reused or decrypted multiple times. As another example, in some embodiments, the monitoring device(s) 108 generates the encrypted verification token 330 to be valid or decryptable only for a specific time window.

It can be appreciated that the monitoring device(s) 108 can utilize a variety of different modes of communication to transmit the encrypted verification token 330 to the licensing device 106a. In some embodiments, the monitoring device(s) 108 transmits the encrypted verification token 330 via a messaging queue. In other embodiments, the monitoring device(s) 108 transmits the encrypted verification token 330 to the licensing device 106a via email, file upload, or other type of digital transfer.

At an act 332, the licensing device 106a decrypts the encrypted verification token 330 received from the monitoring device(s) 108. Specifically, the licensing device 106a processes the encrypted verification token 330 using a licensing device private key 334 and the asymmetric cryptographic algorithm 320 (described above). In one or more embodiments, the licensing device private key 334 corresponds to the licensing device public key 318 used to encrypt the disruption-token data 316 of the encrypted verification token 330. As a result, this approach can increase digital security of inter-device communications because, in certain instances, no other device can decrypt the encrypted verification token 330 except the licensing device 106a.

Moreover, as shown in FIG. 3C, the licensing device 106a returns the disruption-token data 316 upon decrypting the encrypted verification token 330 (particularly the encrypted portions 322). In some embodiments, the disruption-token data 316 comprises information for informing one or more users associated with the licensing device 106a about the disruption at the authentication device(s) 104.

Additionally or alternatively, in some embodiments, the licensing device 106a uses the disruption-token data 316 to perform various acts. For example, in certain instances, the licensing device 106a automatically transmits a digital communication to one or more client devices regarding details of the disruption-token data 316 (e.g., upon authentication of a digital signature at act 336 described below). As another example, the licensing device 106a can provide, for display within a graphical user interface, selectable options to execute additional security protocols, display portions of the disruption-token data 316, share the disruption-token data 316 with other licensing devices, or generate device reminders, alerts, or calendar events regarding the disruption. In yet another example, the licensing device 106a automatically retrieves, from the disruption-token data 316, a public key that corresponds to the monitoring device(s) 108 for authentication at the act 336.

Figure 3D:
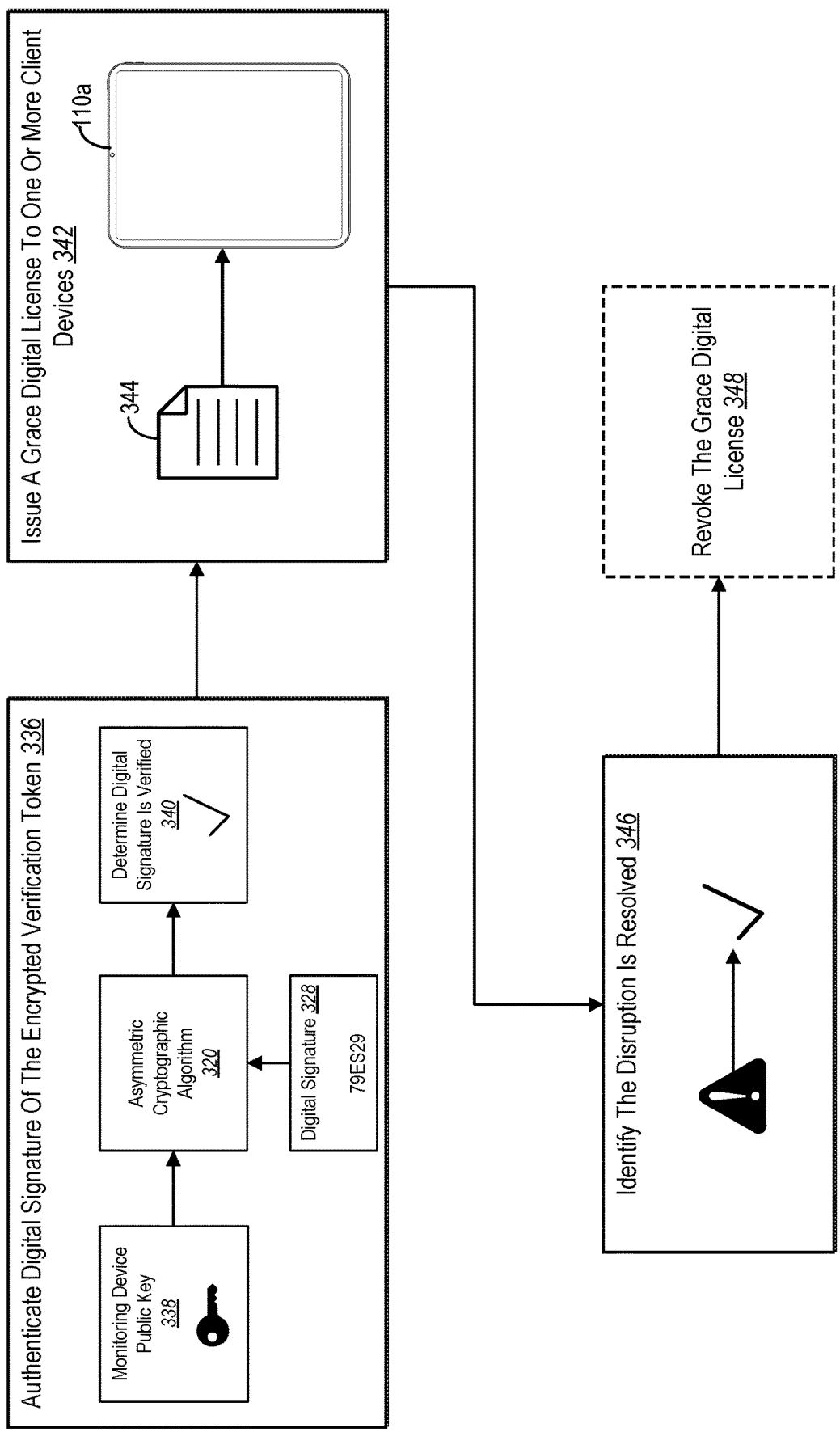

At the act 336 in FIG. 3D, the licensing device 106a authenticates the digital signature 328 of the encrypted verification token 330. Specifically, the licensing device 106a processes the digital signature 328 utilizing a monitoring device public key 338. To do so, in some embodiments, the licensing device 106a retrieves the monitoring device public key 338 directly from the disruption-token data 316. In other embodiments, the licensing device 106a identifies one or more filenames and/or file locations provided in the disruption-token data 316 that identify where the monitoring device public key 338 is available for download. In turn, the licensing device 106a downloads the monitoring device public key 338. Subsequently, the licensing device 106a uses the monitoring device public key 338 together with the asymmetric cryptographic algorithm 320 to decrypt the digital signature 328.

At an act 340, the licensing device 106a determines the digital signature 328 is verified. For example, the digital signature 328 (when decrypted) reveals the signature data 327. In turn, revealing the signature data 327 provides authentic digital evidence that the monitoring device(s) 108 generated the encrypted verification token 330 (as opposed to an imposter device). Additionally, in certain implementations, the licensing device 106a compares the revealed signature data 327 with predetermined data to identify a verified data match.

In contrast, the licensing device 106a cannot verify the digital signature 328 in some instances. For example, the licensing device 106a cannot verify the digital signature 328 when the licensing device 106a processes the digital signature 328 but fails to reveal the signature data 327. As another example, the licensing device 106a cannot verify the digital signature 328 when the revealed signature data 327 fails to match the predetermined data. In these examples, the licensing device 106a does not proceed to act 342. Moreover, in some cases, the licensing device 106a initiates one or more attempted breach protocols (e.g., blacklisting a device that sent the encrypted verification token 330).

Based on authenticating the digital signature 328, at an act 342 the licensing device 106a issues a grace digital license 344 to one or more client devices. For example, in one or more embodiments, the licensing device 106a receives a request from the client device 110a to access and/or use a software application. In response to the request, the licensing device 106a provides the grace digital license 344 to the client device 110a. For instance, the licensing device 106a transmits the grace digital license 344 to the client device 110a via a network connection. With the grace digital license 344, the client device 110a can then use and/or access the requested software application during a grace period (e.g., a temporary time period) that expires after the disruption is resolved.

At an act 346, the licensing device 106a identifies that the disruption at the authentication device(s) 104 is resolved. For example, in some embodiments, the licensing device 106a receives a digital communication from at least one of the authentication device(s) 104 or the monitoring device(s) indicating that the disruption is resolved (e.g., based on monitored system metrics). In other embodiments, the software management system 103 identifies the disruption is resolved based on one or more system metrics detected for the authentication device(s) 104. To illustrate, the monitoring device(s) 108 may indicate the disruption is resolved based on detecting one or more of time-series data, counter data, gauge data, histogram data, etc. that indicates the disruption at the authentication device(s) 104 is resolved.

At an optional act 348, the licensing device 106a revokes the grace digital license 344. For example, in some instances, the licensing device 106a revokes the grace digital license 344 after identifying the disruption at the authentication device(s) 104 is resolved. To illustrate, the licensing device 106a revokes the grace digital license 344 by cancelling or stopping the grace digital license 344 such that the client device 110a cannot use and/or access the software application. In particular embodiments, the licensing device 106a revokes the grace digital license notwithstanding at least some time remains for the grace period during which the grace digital license 344 would otherwise remain valid. In other embodiments, the licensing device 106a passively revokes the grace digital license 344 by allowing the grace period to lapse.

Figure 3E:
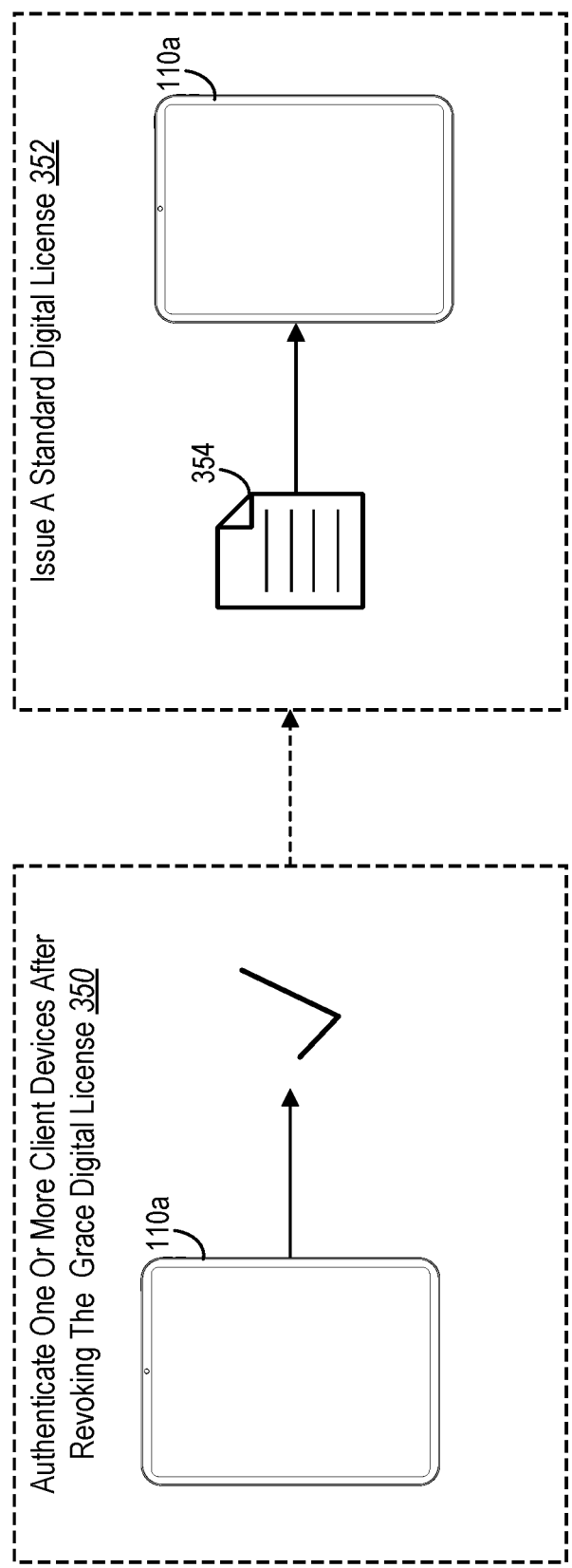

At another optional act 350 shown in FIG. 3E, the licensing device 106a authenticates one or more client devices after revoking a grace digital license. For example, in some embodiments, the licensing device 106a authenticates the client device 110a automatically after revoking the grace digital license 344 at the act 348. To illustrate, the licensing device 106a can use the authentication device(s) 104 (now online) to authenticate login credentials, client device identifiers, etc. of the client device 110a. By automatically authenticating, this approach can decrease a load time for the client device 110a to launch and/or access the software application at a later time. Alternatively, in some embodiments, the licensing device 106a authenticates the client device 110a upon request to access or use the software application (e.g., upon launching of the software application). Under this rolling-basis approach, the licensing device 106a can conserve computer resources at one or both of the licensing device 106a or the authentication device(s) 104.

At another optional act 352, the licensing device 106a issues a standard digital license 354 to the client device 110a. In particular embodiments, the licensing device 106a issues the standard digital license 354 in response to authenticating the one or more client devices at the act 350 (e.g., the client device 110a).

Alternatively to the foregoing description, in some embodiments, the software management system 103 implements a variety of different system architectures, different orders of operations, and acts performed in whole or in part on different components. To illustrate, in some embodiments, the software management system 103 does not implement a licensing device. In this example, the monitoring device(s) 108 communicates directly with one or more client devices to issue a grace digital license to the one or more client devices during a disruption. Accordingly, in certain implementations, the monitoring device(s) 108 performs one or more of the foregoing acts described in relation to the licensing device 106a performing the act(s). Similarly, in some instances, the monitoring device(s) 108 modifies or omits performance of one or more of the foregoing acts described in relation to the licensing device 106a performing the act(s).

To illustrate, in some embodiments, the monitoring device(s) 108 assigns a client device a public key when registering a client device in the disruption registry. Subsequently, upon identifying a disruption at the authentication device(s) 104, the monitoring device(s) 108 can encrypt a verification token using a public key for the client device included in the disruption registry. In turn, the client device can decrypt the encrypted verification token received directly from the monitoring device(s) 108. For example, the client device processes the encrypted verification token using an asymmetric cryptographic algorithm in combination with a private key of the client device. In at least some implementations, the client device stores its private key in a secure location accessible only by an authorized user of the client device. In this manner, the client device can securely decrypt the encrypted verification token. Moreover, the client device can now request a grace digital license from the monitoring device(s) 108 (e.g., using information included in the decrypted verification token).

Further, in some embodiments, the software management system 103 uses one or more different cryptographic algorithms. For example, in certain instances, the monitoring device(s) 108 communicates directly with the one or more client devices (as just described) using a symmetric cryptographic algorithm instead of an asymmetric cryptographic algorithm. Some examples of symmetric cryptographic algorithms include Advanced Encryption Standard, Data Encryption Standard, International Data Encryption Algorithm, Blowfish, Rivest Cipher 4, Rivest Cipher 5, and Rivest Cipher 6.

Figure 4:
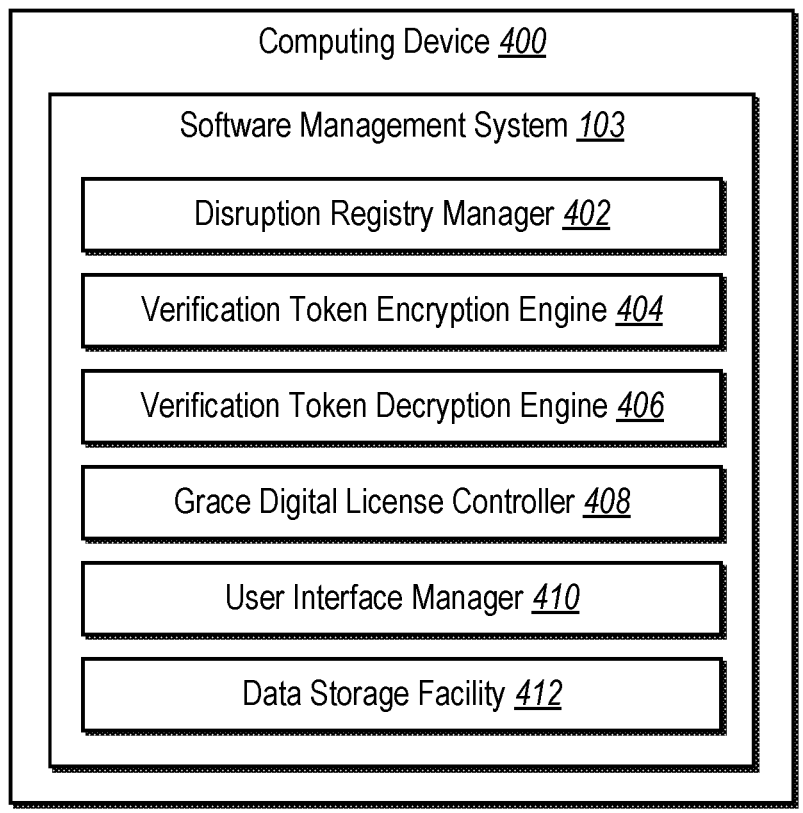
FIG. 4 illustrates an example schematic diagram of a software management system in accordance with one or more embodiments.

Turning to FIG. 4, additional detail will now be provided regarding various components and capabilities of the software management system 103. In particular, FIG. 4 illustrates an example schematic diagram of a computing device 400 (e.g., the authentication device(s) 104, the licensing device(s) 106, the monitoring device(s) 108, the client devices 110a-110n, and/or the third-party server(s) 114) implementing the software management system 103 in accordance with one or more embodiments of the present disclosure. As shown, the software management system 103 includes a disruption registry manager 402, a verification token encryption engine 404, a verification token decryption engine 406, a grace digital license controller 408, a user interface manager 410, and a data storage facility 412.

The disruption registry manager 402 generates, provides, stores, and/or controls a disruption registry (as described in relation to the foregoing figures). In particular embodiments, the disruption registry manager 402 receives licensing device identifiers and corresponding public keys from licensing devices. Additionally, in some embodiments, the disruption registry manager 402 extracts a public key for providing to the verification token encryption engine 404 (e.g., based on a verification request from a licensing device).

The verification token encryption engine 404 generates, stores, and transmits encrypted verification tokens (as described in relation to the foregoing figures). In particular embodiments, the verification token encryption engine 404 uses a public key of a licensing device to encrypt portions of an encrypted verification token (e.g., that describe details of a system disruption). Further, in some embodiments, the verification token encryption engine 404 uses a private key of a monitoring device to digitally sign an encrypted verification token.

The verification token decryption engine 406 decrypts encrypted verification tokens (as described in relation to the foregoing figures). In particular embodiments, the verification token decryption engine 406 processes an encrypted verification token using an asymmetric cryptographic algorithm and a private key of the licensing device. Further, in some embodiments, the 406 verifies a digital signature using an asymmetric cryptographic algorithm and a public key of the monitoring device.

The grace digital license controller 408 issues a grace digital license to one or more client devices (as described in relation to the foregoing figures). In particular embodiments, the grace digital license controller 408 issues grace digital licenses to requesting client devices based on authenticating an encrypted verification token that indicates a disruption at an authentication device. Additionally, in some embodiments, the grace digital license controller 408 revokes grace digital licenses based on identifying that a disruption is resolved and/or that a grace period has expired.

In one or more embodiments, the user interface manager 410 provides, manages, and/or controls a graphical user interface (or simply "user interface"). In particular embodiments, the user interface manager 410 generates and displays a user interface by way of a display screen composed of a plurality of graphical components, objects, and/or elements that allow a user to perform a function. For example, the user interface manager 410 receives user inputs from an administrator, such as a click/tap to view, edit, interact with, or transmit a verification request or encrypted verification token. Additionally, in one or more embodiments, the user interface manager 410 presents a variety of types of information, including text or other information for presentation in a user interface.

The data storage facility 412 maintains data for the software management system 103. The data storage facility 412 (e.g., via one or more memory devices or servers) maintains data of any type, size, or kind, as necessary to perform the functions of the software management system 103. For example, the data storage facility 412 stores encryption keys (whether public and/or private). As additional examples, the data storage facility 412 stores licensing device identifiers, encryption algorithms, etc.

Each of the components of the computing device 400 can include software, hardware, or both. For example, the components of the computing device 400 can include one or more instructions stored on a computer-readable storage medium and executable by processors of one or more computing devices, such as a client device or server device. When executed by the one or more processors, the computer-executable instructions of the software management system 103 can cause the computing device(s) (e.g., the computing device 400) to perform the methods described herein. Alternatively, the components of the computing device 400 can include hardware, such as a special-purpose processing device to perform a certain function or group of functions. Alternatively, the components of the computing device 400 can include a combination of computer-executable instructions and hardware.

Furthermore, the components of the computing device 400 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 400 may be implemented as a stand-alone application, such as a desktop or mobile application. Furthermore, the components of the computing device 400 may be implemented as one or more web-based applications hosted on a remote server.

The components of the computing device 400 may also be implemented in a suite of mobile device applications or "apps." To illustrate, the components of the computing device 400 may be implemented in an application, including but not limited to CREATIVE CLOUD®, DOCUMENT CLOUD®, ILLUSTRATOR®, PHOTO SHOP®, LIGHTROOM®, ADOBE® SENSEI™, ADOBE® SIGN, or ADOBE® PREMIERE®. Product names, including "ADOBE" and any other portion of one or more of the foregoing product names, may include registered trademarks or trademarks of Adobe Inc. in the United States and/or other countries.

Figure 5A:
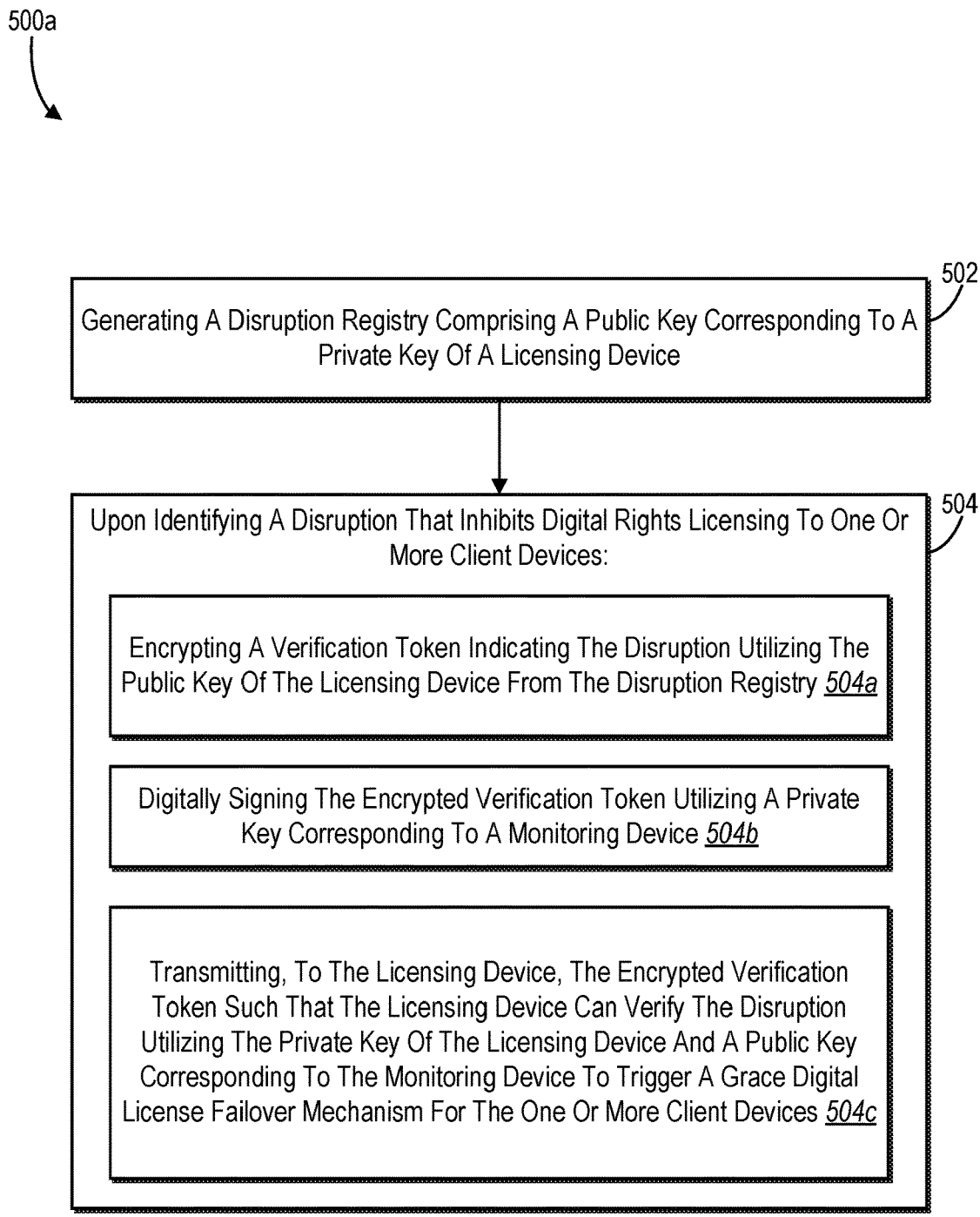
FIGS. 5A-5B illustrate flowcharts of a series of acts for triggering a grace digital license failover mechanism in accordance with one or more embodiments.
Figure 5B:
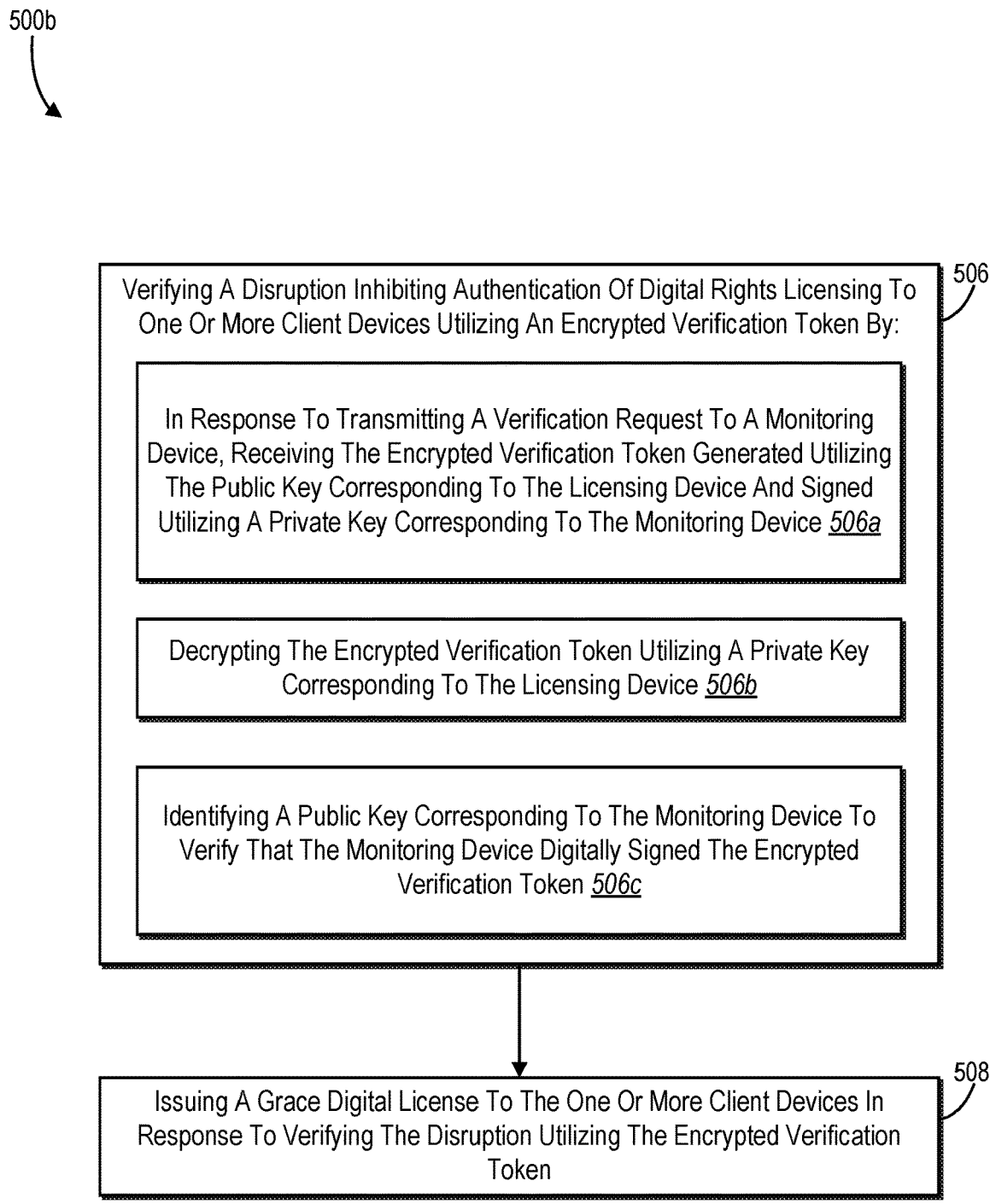

FIGS. 1-4, the corresponding text, and the examples provide several different systems, methods, techniques, components, and/or devices of the software management system 103 in accordance with one or more embodiments. In addition to the above description, one or more embodiments can also be described in terms of flowcharts including acts for accomplishing a particular result. For example, FIGS. 5A-5B illustrate a flowchart of a series of acts 500a-500b for triggering a grace digital license failover mechanism in accordance with one or more embodiments. The software management system 103 may perform one or more acts of the series of acts 500a-500b in addition to or alternatively to one or more acts described in conjunction with other figures. While FIGS. 5A-5B illustrate acts according to one embodiment, alternative embodiments may omit, add to, reorder, and/or modify any of the acts shown in FIGS. 5A-5B. The acts of FIGS. 5A-5B can be performed as part of a method. Alternatively, a non-transitory computer-readable medium can comprise instructions that, when executed by one or more processors, cause a computing device to perform the acts of FIGS. 5A-5B. In some embodiments, a system can perform the acts of FIGS. 5A-5B.

As shown in FIG. 5A, the series of acts 500a includes an act 502 of generating a disruption registry comprising a public key corresponding to a private key of a licensing device.

The series of acts 500a also includes an act 504 of performing acts upon identifying a disruption that inhibits digital rights licensing to one or more client devices. In particular, the act 504 comprises an act 504a of encrypting a verification token indicating the disruption utilizing the public key of the licensing device from the disruption registry. For example, in some embodiments, the act 504a includes encrypting the verification token by generating a JSON web token comprising disruption-token data corresponding to at least one of the disruption or the encrypted verification token. In certain instances, the disruption-token data includes at least one of an estimated duration of the disruption, a length of time during which the encrypted verification token is valid, or a list of public keys that can validate a digital signature of the encrypted verification token. As another example, the act 504a includes generating the encrypted verification token for single-use verification.

Additionally, the act 504 comprises an act 504b of digitally signing the encrypted verification token utilizing a private key corresponding to a monitoring device. In some embodiments, a digital signature of the encrypted verification token is verifiable using a public key of the monitoring device.

Further, the act 504 comprises an act 504c of transmitting, to the licensing device, the encrypted verification token such that the licensing device can verify the disruption utilizing the private key of the licensing device and a public key corresponding to the monitoring device to trigger a grace digital license failover mechanism for the one or more client devices. In one or more embodiments, the grace digital license failover mechanism for the one or more client devices comprises issuance of a temporary digital license for the one or more client devices to access a software application in accordance with the temporary digital license.

Further, in some embodiments, the act 504c includes transmitting the encrypted verification token in response to receiving a verification request from the licensing device, the verification request comprising a digital identifier for identifying the licensing device and the corresponding public key in the disruption registry.

It is understood that the outlined acts in the series of acts 500a are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 5A, act(s) in the series of acts 500a may include an act of identifying the disruption by detecting at least one of a verification runtime error, a system outage, or a maintenance update affecting an authentication device such that the authentication device is prevented from verifying digital rights of the one or more client devices.

As another example of an additional act not shown in FIG. 5A, act(s) in the series of acts 500a may include an act of in response to determining that the disruption is resolved, transmitting a digital notification to the licensing device indicating that the disruption is resolved such that the licensing device stops the grace digital license failover mechanism.

In yet another example of an additional act not shown in FIG. 5A, act(s) in the series of acts 500a may include an act of identifying the disruption in response to one or more notifications from a third-party server. In some embodiments, the act further includes in response to identifying the disruption, transmitting, in addition to the encrypted verification token, a digital communication to the licensing device indicating the disruption. For example, the act may include transmitting the digital communication by sending a digital notification to one or more messaging queues to which licensing devices subscribe.

In FIG. 5B, the series of acts 500b includes an act 506 of verifying a disruption inhibiting authentication of digital rights licensing to one or more client devices utilizing an encrypted verification token by performing one or more acts. In particular, the act 506 comprises an act 506a of in response to transmitting a verification request to a monitoring device, receiving the encrypted verification token generated utilizing the public key corresponding to the licensing device and signed utilizing a private key corresponding to the monitoring device.

Additionally, the act 506 comprises an act 506b of decrypting the encrypted verification token utilizing a private key corresponding to the licensing device.

Further, the act 506 comprises an act 506c of identifying a public key corresponding to the monitoring device to verify that the monitoring device digitally signed the encrypted verification token.

The series of acts 500b also includes an act 508 of issuing a grace digital license to the one or more client devices in response to verifying the disruption utilizing the encrypted verification token. In one or more embodiments, the grace digital license comprises digital rights for the one or more client devices to access a software application during a grace period expiring after the disruption is resolved.

It is understood that the outlined acts in the series of acts 500b are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 5B, act(s) in the series of acts 500b may include an act of providing, to the monitoring device, the public key of the licensing device to register the licensing device in a disruption registry.

As another example of an additional act not shown in FIG. 5B, act(s) in the series of acts 500b may include an act of: receiving, via one or more messaging queues, a digital communication that indicates the disruption; and in response to receiving the digital communication, transmit the verification request to the monitoring device, the verification request comprising a digital identifier identifying the licensing device and the corresponding public key in the disruption registry and a request for the encrypted verification token.

In yet another example of an additional act not shown in FIG. 5B, act(s) in the series of acts 500b may include an act of: receiving, from the monitoring device, a digital notification that the disruption is resolved; and revoking the grace digital license for the one or more client devices in response to identifying that the disruption is resolved based on the digital notification.

Still further, another example of an additional act not shown in FIG. 5B includes an act of: authenticating the one or more client devices utilizing an authentication device; and issuing a standard digital license for at least one of the one or more client devices after revoking the grace digital license.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

FIG. 6 illustrates a block diagram of an example computing device 600 that may be configured to perform one or more of the processes described above. One will appreciate that one or more computing devices, such as the computing device 600 may represent the computing devices described above (e.g., the authentication device(s) 104, the licensing device(s) 106, the monitoring device(s) 108, the client devices 110a-110n, the third-party server(s) 114, and/or the computing device 400). In one or more embodiments, the computing device 600 may be a mobile device (e.g., a mobile telephone, a smartphone, a PDA, a tablet, a laptop, a camera, a tracker, a watch, a wearable device, etc.). In some embodiments, the computing device 600 may be a non-mobile device (e.g., a desktop computer or another type of client device). Further, the computing device 600 may be a server device that includes cloud-based processing and storage capabilities.

As shown in FIG. 6, the computing device 600 can include one or more processor(s) 602, memory 604, a storage device 606, input/output interfaces 608 (or "I/O interfaces 608"), and a communication interface 610, which may be communicatively coupled by way of a communication infrastructure (e.g., bus 612). While the computing device 600 is shown in FIG. 6, the components illustrated in FIG. 6 are not intended to be limiting. Additional or alternative components may be used in other embodiments. Furthermore, in certain embodiments, the computing device 600 includes fewer components than those shown in FIG. 6. Components of the computing device 600 shown in FIG. 6 will now be described in additional detail.

In particular embodiments, the processor(s) 602 includes hardware for executing instructions, such as those making up a computer program. As an example, and not by way of limitation, to execute instructions, the processor(s) 602 may retrieve (or fetch) the instructions from an internal register, an internal cache, memory 604, or a storage device 606 and decode and execute them.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 604 may be internal or distributed memory.

The computing device 600 includes a storage device 606 includes storage for storing data or instructions. As an example, and not by way of limitation, the storage device 606 can include a non-transitory storage medium described above. The storage device 606 may include a hard disk drive (HDD), flash memory, a Universal Serial Bus (USB) drive or a combination these or other storage devices.

As shown, the computing device 600 includes one or more I/O interfaces 608, which are provided to allow a user to provide input to (such as user strokes), receive output from, and otherwise transfer data to and from the computing device 600. These I/O interfaces 608 may include a mouse, keypad or a keyboard, a touch screen, camera, optical scanner, network interface, modem, other known I/O devices or a combination of such I/O interfaces 608. The touch screen may be activated with a stylus or a finger.

The I/O interfaces 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 608 are configured to provide graphical data to a display for presentation to a user. The graphical data may be representative of one or more graphical user interfaces and/or any other graphical content as may serve a particular implementation.

The computing device 600 can further include a communication interface 610. The communication interface 610 can include hardware, software, or both. The communication interface 610 provides one or more interfaces for communication (such as, for example, packet-based communication) between the computing device and one or more other computing devices or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI. The computing device 600 can further include a bus 612. The bus 612 can include hardware, software, or both that connects components of the computing device 600 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
generate a disruption registry comprising a public key corresponding to a private key of a licensing device; and
upon identifying a disruption that inhibits digital rights licensing to one or more client devices:
encrypt a verification token indicating the disruption utilizing the public key of the licensing device from the disruption registry;
digitally sign the encrypted verification token utilizing a private key corresponding to a monitoring device; and
transmit, to the licensing device, the encrypted verification token such that the licensing device can verify the disruption utilizing the private key of the licensing device and a public key corresponding to the monitoring device to trigger a grace digital license failover mechanism for the one or more client devices.

2. The non-transitory computer-readable storage medium of claim 1, further comprising instructions that, when executed by the at least one processor, cause the computing device to identify the disruption by detecting at least one of a verification runtime error, a system outage, or a maintenance update affecting an authentication device such that the authentication device is prevented from verifying digital rights of the one or more client devices.

3. The non-transitory computer-readable storage medium of claim 1, wherein the grace digital license failover mechanism for the one or more client devices comprises issuance of a temporary digital license for the one or more client devices to access a software application in accordance with the temporary digital license.

4. The non-transitory computer-readable storage medium of claim 1, further comprising instructions that, when executed by the at least one processor, cause the computing device to, in response to determining that the disruption is resolved, transmit a digital notification to the licensing device indicating that the disruption is resolved such that the licensing device stops the grace digital license failover mechanism.

5. The non-transitory computer-readable storage medium of claim 1, further comprising instructions that, when executed by the at least one processor, cause the computing device to, in response to identifying the disruption, transmit, in addition to the encrypted verification token, a digital communication to the licensing device indicating the disruption.

6. The non-transitory computer-readable storage medium of claim 5, further comprising instructions that, when executed by the at least one processor, cause the computing device to transmit the digital communication by sending a digital notification to one or more messaging queues to which licensing devices subscribe.

7. The non-transitory computer-readable storage medium of claim 1, further comprising instructions that, when executed by the at least one processor, cause the computing device to transmit the encrypted verification token in response to receiving a verification request from the licensing device, the verification request comprising a digital identifier for identifying the licensing device and the corresponding public key in the disruption registry.

8. The non-transitory computer-readable storage medium of claim 1, further comprising instructions that, when executed by the at least one processor, cause the computing device to encrypt the verification token by generating a JSON web token comprising disruption-token data corresponding to at least one of the disruption or the encrypted verification token.

9. The non-transitory computer-readable storage medium of claim 1, further comprising instructions that, when executed by the at least one processor, cause the computing device to generate the encrypted verification token for single-use verification.

10. A system comprising:
one or more memory devices comprising a private key corresponding to a public key of a licensing device; and
one or more servers configured to cause the system to:
verify a disruption inhibiting authentication of digital rights licensing to one or more client devices utilizing an encrypted verification token by:

in response to transmitting a verification request to a monitoring device, receiving the encrypted verification token generated utilizing the public key corresponding to the licensing device and signed utilizing a private key corresponding to the monitoring device;

decrypting the encrypted verification token utilizing a private key corresponding to the licensing device; and identifying a public key corresponding to the monitoring device to verify that the monitoring device digitally signed the encrypted verification token; and issue a grace digital license to the one or more client devices in response to verifying the disruption utilizing the encrypted verification token.

11. The system of claim 10, wherein the one or more servers are configured to cause the system to issue the grace digital license comprising digital rights for the one or more client devices to access a software application during a grace period expiring after the disruption is resolved.

12. The system of claim 10, wherein the one or more servers are configured to cause the system to provide, to the monitoring device, the public key of the licensing device to register the licensing device in a disruption registry.

13. The system of claim 12, wherein the one or more servers are configured to cause the system to:

receive, via one or more messaging queues, a digital communication that indicates the disruption; and in response to receiving the digital communication, transmit the verification request to the monitoring device, the verification request comprising a digital identifier identifying the licensing device and the corresponding public key in the disruption registry and a request for the encrypted verification token.

14. The system of claim 10, wherein the one or more servers are configured to cause the system to:

receive, from the monitoring device, a digital notification that the disruption is resolved at an authentication device; and revoke the grace digital license for the one or more client devices in response to identifying that the disruption is resolved based on the digital notification.

15. The system of claim 14, wherein the one or more servers are configured to cause the system to:

authenticate the one or more client devices utilizing the authentication device; and issue a standard digital license for at least one of the one or more client devices after revoking the grace digital license.

16. A computer-implemented method comprising:

generating a disruption registry comprising a plurality of public keys corresponding to a plurality of private keys of a plurality of licensing devices;

in response to identifying a disruption inhibiting authentication of digital rights licensing to one or more client devices, transmitting a digital communication to the plurality of licensing devices indicating the disruption;

identifying, from a licensing device of the plurality of licensing devices, a verification request comprising a licensing device identifier;

determining a public key corresponding to the licensing device utilizing the licensing device identifier and the disruption registry;

encrypting a verification token utilizing the public key of the licensing device, the encrypted verification token indicating disruption-token data corresponding to at least one of the disruption or the encrypted verification token; and transmitting, to the licensing device, the encrypted verification token such that the licensing device decrypts the encrypted verification token utilizing a private key of the licensing device to verify the disruption.

17. The computer-implemented method of claim 16, further comprising digitally signing the encrypted verification token utilizing a private key corresponding to a monitoring device, wherein a digital signature of the encrypted verification token is verifiable using a public key of the monitoring device.

18. The computer-implemented method of claim 16, further comprising identifying the disruption in response to one or more notifications from a third-party server.

19. The computer-implemented method of claim 16, further comprising:

identifying that the disruption is resolved; and transmitting a digital notification to the licensing device indicating that the disruption is resolved.

20. The computer-implemented method of claim 16, wherein the disruption-token data includes at least one of an estimated duration of the disruption, a length of time during which the encrypted verification token is valid, or a list of public keys that can validate a digital signature of the encrypted verification token.

* * * * *